(12) United States Patent
Hirata et al.

(10) Patent No.: US 9,731,495 B2
(45) Date of Patent: Aug. 15, 2017

(54) METHOD OF MANUFACTURING THREE-DIMENSIONAL STRUCTURE, THREE-DIMENSION FORMATION MATERIAL SET, AND THREE-DIMENSIONAL STRUCTURE

(71) Applicant: Seiko Epson Corporation, Tokyo (JP)

(72) Inventors: Koki Hirata, Matsumoto (JP); Shinichi Kato, Matsumoto (JP); Hiroshi Fukumoto, Shiojiri (JP); Chigusa Sato, Shiojiri (JP)

(73) Assignee: Seiko Epson Corporation (JP)

( * ) Notice: Subject to any disclaimer, the term of this patent is extended or adjusted under 35 U.S.C. 154(b) by 156 days.

(21) Appl. No.: 14/847,372

(22) Filed: Sep. 8, 2015

(65) Prior Publication Data

US 2016/0067916 A1 Mar. 10, 2016

(30) Foreign Application Priority Data

Sep. 9, 2014 (JP) ................................. 2014-183382

(51) Int. Cl.
| | | |
|---|---|---|
| *B29C 67/00* | (2017.01) | |
| *B33Y 10/00* | (2015.01) | |
| *B33Y 70/00* | (2015.01) | |
| *B33Y 80/00* | (2015.01) | |
| *B29K 105/00* | (2006.01) | |

(52) U.S. Cl.
CPC .......... *B33Y 70/00* (2014.12); *B29C 67/0081* (2013.01); *B33Y 10/00* (2014.12); *B33Y 80/00* (2014.12); *B29K 2105/0064* (2013.01)

(58) Field of Classification Search
None
See application file for complete search history.

(56) References Cited

U.S. PATENT DOCUMENTS

| | | | |
|---|---|---|---|
| 5,204,055 A | | 4/1993 | Sachs et al. |
| 8,425,816 B2 * | | 4/2013 | Okamoto ................ C08L 83/04 264/109 |
| 2009/0020920 A1 * | | 1/2009 | Kumagai ............ B29C 67/0081 264/401 |
| 2016/0263828 A1 * | | 9/2016 | Ederer ................ B29C 67/0081 |
| 2016/0312037 A1 * | | 10/2016 | Zhao .................... B29C 67/0051 |

FOREIGN PATENT DOCUMENTS

JP  06-218712 A  8/1994

* cited by examiner

*Primary Examiner* — Mary F Theisen
(74) *Attorney, Agent, or Firm* — Haress, Dickey & Pierce, P.L.C.

(57) ABSTRACT

There is provided a method of manufacturing a three-dimensional structure, in which the three-dimensional structure is manufactured by laminating a layer, the method including: forming the layer using a three-dimension formation composition containing particles having hydrophilicity on a surface thereof, a water-soluble resin, and a water-based solvent; and discharging an ultraviolet-curable ink containing a water-soluble monomer onto the layer.

11 Claims, 4 Drawing Sheets

METHOD OF MANUFACTURING THREE-DIMENSIONAL STRUCTURE, THREE-DIMENSION FORMATION MATERIAL SET, AND THREE-DIMENSIONAL STRUCTURE

BACKGROUND

1. Technical Field

The present invention relates to a method of manufacturing a three-dimensional structure, a three-dimension formation material set, and a three-dimensional structure.

2. Related Art

A technology of forming a three-dimensional object while hardening powder with a binding solution is known (for example, refer to JP-A-06-218712). In this technology, a three-dimensional object is formed by repeating the following operations. First, powder particles are thinly spread in a uniform thickness to form a powder layer, and a binding solution is discharged onto a desired portion of the powder layer to bind the powder particles together. As a result, in the powder layer, only the portion onto which the binding solution is discharged is attached to form a thin plate-like member (hereinafter referred to as "section member"). Thereafter, a thin powder layer is further formed on this powder layer, and a binding solution (curable ink) is discharged to a desired portion thereof. As a result, a new section member is formed even on the portion of the newly-formed powder layer to which the binding solution is discharged. In this case, since the binding solution discharged on the powder layer penetrates this layer to reach the previously-formed section member, the newly-formed section member is attached to the previously-formed section member. The thin plate-like section members are laminated one by one by repeating these operations, thereby forming a three-dimensional object.

In this technology of forming a three-dimensional object, when three-dimensional shape data of an object to be formed exists, it is possible to directly form a three-dimensional object by binding powder particles, and there is no need to create a mold prior to formation, so that it is possible to quickly and inexpensively form a three-dimensional object. In addition, since the three-dimensional object is formed by laminating the thin plate-like section members one by one, for example, even in the case of a complex object having a complicated internal structure, it is possible to form the three-dimensional object as an integrally-formed structure without dividing the complex object into a plurality of parts.

However, in the related art, there is problem in that the binding force attributable to the binding solution cannot be made sufficiently high, and thus the strength of a three-dimensional structure cannot be made sufficiently high.

SUMMARY

An advantage of some aspects of the invention is to provide a method of manufacturing a three-dimensional structure, by which a three-dimensional structure having excellent mechanical strength can be efficiently manufactured, to provide a three-dimension formation material set, by which a three-dimensional structure having excellent mechanical strength can be efficiently manufactured, and to provide a three-dimensional structure having excellent mechanical strength.

The above advantage is achieved by the following aspects of the invention.

According to an aspect of the invention, there is provided a method of manufacturing a three-dimensional structure, in which the three-dimensional structure is manufactured by laminating a layer, the method including: forming the layer using a three-dimension formation composition containing particles having hydrophilicity on a surface thereof, a water-soluble resin, and a water-based solvent; and discharging an ultraviolet-curable ink containing a water-soluble monomer onto the layer.

In this case, it is possible to provide a method of manufacturing a three-dimensional structure, by which a three-dimensional structure having excellent mechanical strength can be efficiently manufactured.

In the method of manufacturing a three-dimensional structure according to the aspect of the invention, it is preferable that the method further includes: removing the particles, which are not bound by the ultraviolet-curable ink, after repeating the forming of the layer and the discharging of the ultraviolet-curable ink.

In this case, it is possible to more efficiently manufacture a three-dimensional structure having excellent mechanical strength.

In the method of manufacturing a three-dimensional structure according to the aspect of the invention, it is preferable that the particle has at least one functional group selected from the group consisting of a hydroxyl group, a carboxyl group, and an amino group, on the surface thereof.

In this case, it is possible to make the mechanical strength of the finally obtained three-dimensional structure particularly excellent.

In the method of manufacturing a three-dimensional structure according to the aspect of the invention, it is preferable that the water-soluble monomer is at least one selected from the group consisting of 4-hydroxybutyl acrylate, 2-hydroxybutyl acrylate, and phenol-based epoxy acrylate.

In this case, it is possible to make the permeability of the ultraviolet-curable ink into the layer further higher.

In the method of manufacturing a three-dimensional structure according to the aspect of the invention, it is preferable that the water-soluble resin contains at least one selected from the group consisting of polyvinyl alcohol, polyvinyl pyrrolidone, sodium polyacrylate, ammonium polyacrylate, carboxymethyl cellulose, hydroxyethyl cellulose, polyethylene oxide, polyethylene glycol, polyacryl amide, and polyethylene imine.

In this case, it is possible to make the affinity of the water-soluble resin to the particle particularly high.

According to another aspect of the invention, there is provided a three-dimension formation material set, which is used to manufacture a three-dimensional structure by laminating a layer, the set including: a three-dimension formation composition containing particles having hydrophilicity on a surface thereof, a water-soluble resin, and a water-based solvent; and an ultraviolet-curable ink containing a water-soluble monomer.

In this case, it is possible to more efficiently manufacture a three-dimensional structure having excellent mechanical strength.

According to still another aspect of the invention, there is provided a three-dimensional structure, which is manufactured by the method of manufacturing a three-dimensional structure of the invention.

In this case, it is possible to provide a three-dimensional structure having excellent mechanical strength.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings.

1. Method of Manufacturing Three-Dimensional Structure

First, a method of manufacturing a three-dimensional structure according to the invention will be described.

Figure 1A:
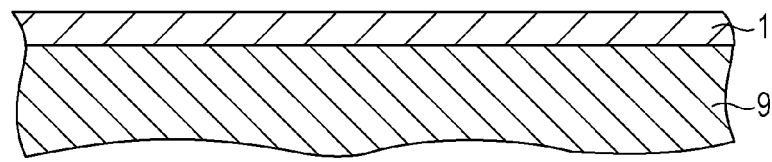
FIGS. 1A to 1D are schematic views showing each process of a preferred embodiment in a method of manufacturing a three-dimensional structure of the invention.
Figure 1B:
Figure 1B:
Figure 1B:
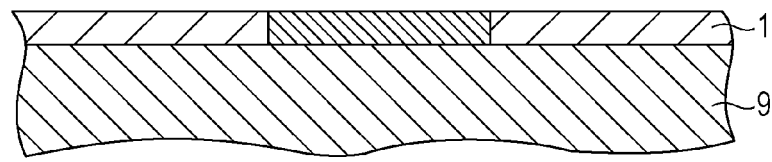
Figure 1C:
Figure 1C:
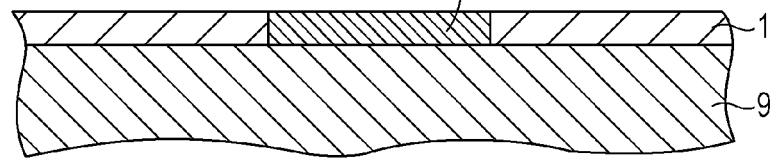
Figure 1D:
Figure 1D:
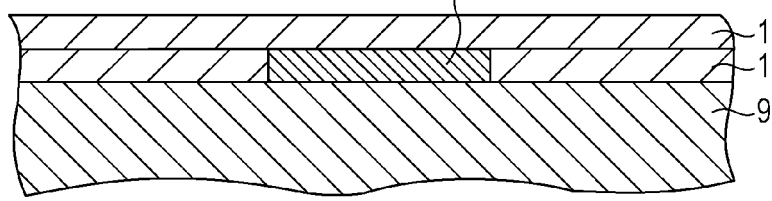
Figure 2A:
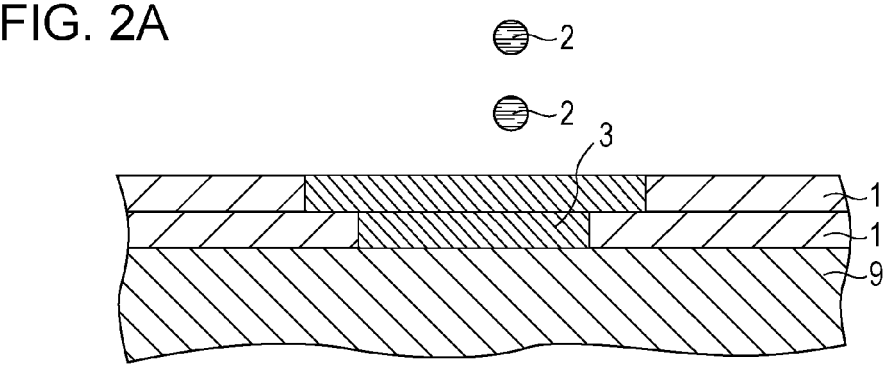
FIGS. 2A to 2D are schematic views showing each process of a preferred embodiment in a method of manufacturing a three-dimensional structure of the invention.
Figure 2B:
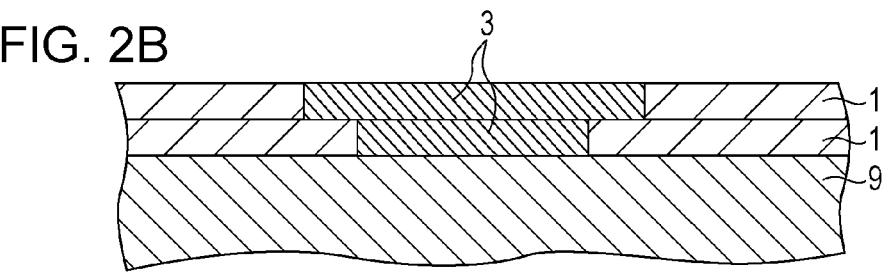
Figure 2C:
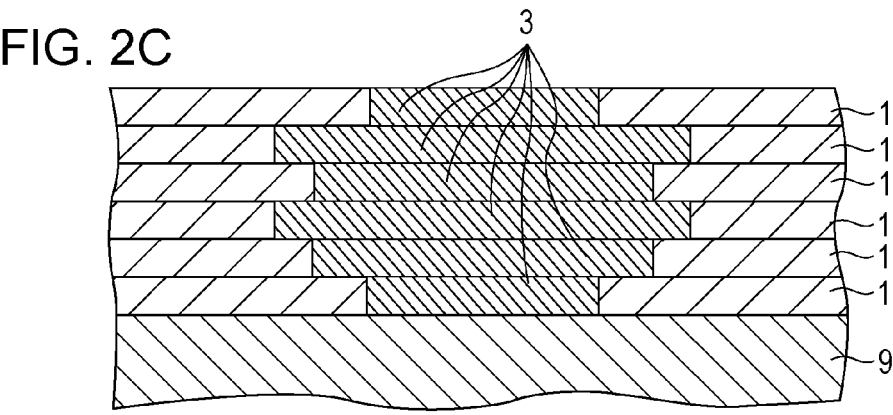
Figure 2D:
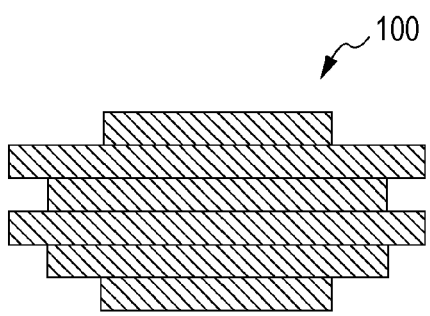
Figure 3:
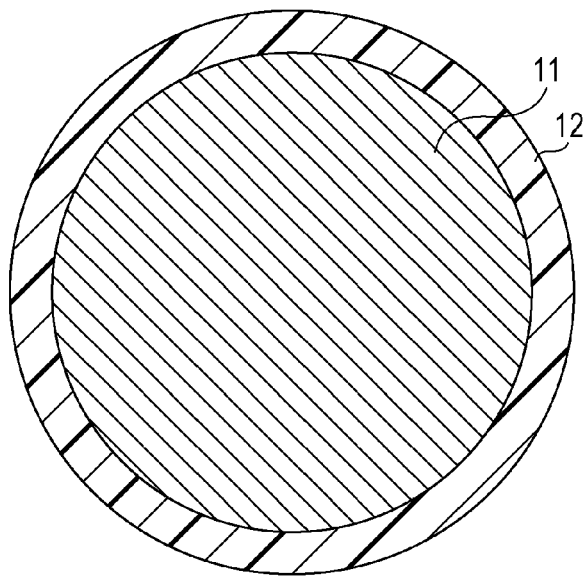
FIG. 3 is a cross-sectional view schematically showing the state of a particle and a water-soluble resin.

FIGS. 1A to 2D are schematic views showing each process of a preferred embodiment in the method of manufacturing a three-dimensional structure of the invention. FIG. 3 is a cross-sectional view schematically showing the state of a particle and a water-soluble resin.

As shown in FIGS. 1A to 2D, the method of manufacturing a three-dimensional structure according to the present embodiment includes: layer forming processes (1A and 1D) of forming layers 1 using a three-dimension formation composition; ink discharge processes (1B and 2A) of applying an ultraviolet-curable ink 2 onto each of the layers 1 by an ink jet method; and curing processes (1C and 2B) of curing the ultraviolet-curable resin contained in the ultraviolet-curable ink 2 applied onto each of the layers 1. Here, these processes are sequentially repeated. The method of manufacturing a three-dimensional structure further includes an unbound particle removal process (2D) of removing particles, which are not bound by the ultraviolet-curable resin, from the particles 11 constituting each of the layers 1.

Layer Forming Process

First, a layer 1 is formed on a support (stage) 9 using a three-dimension formation composition (1A).

The support 9 has a flat surface (site on which the three-dimension formation composition is applied). Thus, it is possible to easily and reliably form the layer 1 having high thickness uniformity.

It is preferable that the support 9 is made of a high-strength material. Various kinds of metal materials, such as stainless steel and the like, are exemplified as the constituent material of the support 9.

In addition, the surface (site on which the three-dimension formation composition is applied) of the support 9 may be surface-treated. Thus, it is possible to more effectively prevent the constituent material of the three-dimension formation composition or the constituent material of the curable ink 2 from adhering to the support 9, and it is also possible to realize the stable production of a three-dimensional structure 100 over a longer period of time by making the durability of the support 9 particularly excellent. As the material used in the surface treatment of the support 9, a fluorine-based resin, such as polytetrafluoroethylene, is exemplified.

The three-dimension formation composition contains a plurality of particles 11 having hydrophilicity on the surface thereof, a water-soluble resin 12, and a water-based solvent.

By allowing the three-dimension formation composition to contain the water-soluble resin 12, the particles 11 are bound (temporarily fixed) together to effectively prevent the involuntary scattering of the particles. Thus, it is possible to improve the safety of workers or the dimensional accuracy of the three-dimensional structure 100 which is manufactured.

In particular, since the particle 11 has hydrophilicity on the surface thereof, the affinity to the water-soluble resin 12 is high. Therefore, in the three-dimension formation composition 1, as shown in FIG. 3, the circumference of the particle 11 is coated with the water-soluble resin 12. Further, since the affinity of the particle 11 to the water-soluble resin 12 is high, the adhesiveness between the particle 11 and the water-soluble resin 12 becomes high. Here, the entire surface of the particle 11 may be completely coated with the water-soluble resin 12.

The particle 11 will be described in detail later.

This process can be performed using a squeegee method, a screen printing method, a doctor blade method, a spin coating method, or the like.

The thickness of the layer 1 formed in this process is not particularly limited, but is preferably 30 μm to 500 μm, and more preferably 70 μm to 150 μm. Thus, the productivity of the three-dimensional structure 100 can be made sufficiently excellent, the occurrence of involuntary unevenness in the manufactured three-dimensional structure 100 can be more effectively prevented, and the dimensional accuracy of the three-dimensional structure 100 can be made particularly excellent.

Ink Discharge Process

Thereafter, an ultraviolet-curable ink 2 containing a water-soluble monomer is discharged onto the layer 1 by an ink jet method (1B).

In this process, the ultraviolet-curable ink 2 is selectively applied to only the site corresponding to the real part (substantial site) of the three-dimensional structure 100 in the layer 1.

Thus, the particles 11 constituting the layer 1 can be more strongly bonded with each other by the ultraviolet-curable ink 2 (ultraviolet-curable resin), and thus the mechanical strength of the finally obtained three-dimensional structure 100 can be made excellent.

Particularly, in the invention, the ultraviolet-curable ink 2 contains a water-soluble monomer. Since this water-soluble monomer has high affinity to the water-soluble resin coating the particle 11 in the layer 1, it is possible to permeate the ultraviolet-curable ink 2 while suitably dissolving the water-soluble resin in the water-soluble monomer. As a result, it is possible to uniformly permeate the ultraviolet-curable ink 2.

In this process, since the ultraviolet-curable ink 2 is applied by an ink jet method, the ultraviolet-curable ink 2 can be applied with good reproducibility even when the pattern of the applied ultraviolet-curable ink 2 has a fine shape.

The ultraviolet-curable ink 2 will be described in detail later.

Curing Process

Next, the ultraviolet-curable ink 2 applied to the layer 1 is cured by irradiating the layer 1 with ultraviolet rays, so as to form a cured portion 3 (1C). Thus, the binding strength between the particles 11 can be made particularly excellent, and, as a result, the mechanical strength of the finally obtained three-dimensional structure 100 can be made particularly excellent.

The ink discharge process and the curing process may be simultaneously performed. That is, the curing reaction may sequentially proceed from the site on which the ultraviolet-curable ink 2 is applied, before the entire pattern of one entire layer 1 is formed.

Thereafter, a series of the processes are repeated (refer to 1D, 2A, and 2B). Thus, in each of the layers 1, the particles 11 are bound to the site on which the ultraviolet-curable ink 2 has been applied, and, in this state, a three-dimensional structure 100 is obtained as a laminate in which the plurality of layers 1 are laminated (refer to 2C).

In the second and subsequent ink discharge processes (refer to 2A), the ultraviolet-curable ink 2 applied onto the layer 1 is used in binding the particles 11 constituting this layer 1, and a part of the applied ultraviolet-curable ink 2 permeates a layer 1 located under this layer 1. For this reason, the ultraviolet-curable ink 2 is used in binding the particles 11 between adjacent layers as well as binding the particles 11 in each of the layers 1. As a result, the finally obtained three-dimensional structure 100 becomes excellent in overall mechanical strength.

Unbound Particle Removal Process

After the aforementioned series of processes are repeated, in the particles 11 constituting each of the layers 1, the unbound particle removal process (2D) of removing the particles (unbound particles) not bound by the ultraviolet-curable resin is performed as a post-treatment process. Thus, a three-dimensional structure 100 is obtained.

Examples of the specific methods of this process include a method of removing unbound particles by wiping with a brush or the like, a method of removing unbound particles by suction, a method of blowing gas such as air, a method of applying a liquid such as water (for example, method of dipping the above-obtained laminate in a liquid or a method of blowing a liquid), and a method of applying a vibration such as ultrasonic vibration. Here, these methods may be used in a combination of two or more. More specifically, a method of blowing a gas such as air and then dipping the laminate into a liquid such as water and a method of imparting ultrasonic vibration to the laminate dipped into liquid such as water are exemplified. Among them, a method of imparting a liquid containing water to the laminate obtained in the manner described above (particularly, a method of dipping the laminate into the liquid containing water) is preferably employed. Thus, in the particles 11 constituting each of the layers 1, particles not bound by the ultraviolet-curable resin are temporarily fixed by the water-soluble resin 12. However, when the liquid containing water is used, the water-soluble resin 12 is dissolved to release the temporary fixation, and thus these unbound particles can be more easily and reliably removed from the three-dimensional structure 100. In addition, it is possible to more reliably prevent the occurrence of defects such as scratches on the three-dimensional structure 100 at the time of removing the unbound particles. Moreover, by employing such a method, the cleaning of the three-dimensional structure 100 can also be performed together with the removing of the unbound particles.

Meanwhile, before the unbound particle removal process, annealing treatment (heat treatment) may be performed with respect to the laminate of the layers 1. Thus, the ultraviolet-curable ink 2 can be more reliably cured, and the mechanical strength of the obtained three-dimensional structure 100 can be further high.

2. Three-Dimension Formation Composition

Next, a three-dimension formation composition will be described in detail.

The three-dimension formation composition contains a plurality of particles 11 and a water-soluble resin 12.

Hereinafter, each component will be described in detail.

Particle

The particle 11 has hydrophilicity on the surface thereof.

The hydrophilicity of the surface of the particle 11 may be expressed by the constituent material of the particle 11, and may also be provided by surface treatment.

In particular, when the particle 11 has at least one functional group (water-soluble functional group) selected from the group consisting of a hydroxyl group, a carboxyl group, and an amino group, on the surface thereof, a hydrogen bond is formed between the water-soluble functional group of the water-soluble resin 12 and the above functional group of the surface of the particle 11, and thus the water-soluble resin 12 more strongly adheres to the surface of the particle 11. As a result, the mechanical strength of the finally obtained three-dimensional structure 100 can be further improved.

The aforementioned water-soluble functional group can be introduced, for example, by surface-treating the surface of the particle using a silane coupling agent.

Examples of the silane coupling agent include bis(2-hydroxyethyl)-3-amino-propyl triethoxysilane, 3-aminopropyl triethoxysilane, alkyl alkoxysilane having an alkyl group substituted with a carboxyl group, and 3-trimethoxysilyl propyl succinic anhydride.

As the constituent materials of the particles 11, for example, inorganic materials, organic materials, and complexes thereof are exemplified.

As the inorganic material constituting the particle 11, for example, various metals and metal compounds are exemplified. Examples of the metal compounds include: various metal oxides, such as silica, alumina, titanium oxide, zinc oxide, zirconium oxide, tin oxide, magnesium oxide, and potassium titanate; various metal hydroxides, such as magnesium hydroxide, aluminum hydroxide, and calcium hydroxide; various metal nitrides, such as silicon nitride, titanium nitride, and aluminum nitride; various metal carbides, such as silicon carbide and titanium carbide; various metal sulfides, such as zinc sulfide; various metal carbonates, such as calcium carbonate and magnesium carbonate; various metal sulfates, such as calcium sulfate and magnesium sulfate; various metal silicates, such as calcium silicate and magnesium silicate; various metal phosphates, such as calcium phosphate; various metal borates, such as aluminum borate and magnesium borate; and complexes thereof.

As the organic material constituting the particle 11, synthetic resins and natural polymers are exemplified. Specific examples of the organic material include polyethylene resins; polypropylene; polyethylene oxide; polypropylene oxide; polyethylene imine; polystyrene; polyurethane; polyurea; polyester; silicone resins; acrylic silicone resins; a polymer containing (meth)acrylic ester as a constituent monomer, such as polymethyl methacrylate; a crosspolymer (ethylene-acrylic acid copolymer resin or the like) containing (meth)acrylic ester as a constituent monomer, such as methyl methacrylate crosspolymer; polyamide resins, such as nylon 12, nylon 6, and copolymerized nylon; polyimide; carboxymethyl cellulose; gelatin; starch; chitin; and chitosan.

Among these, the particle 11 is made of preferably an inorganic material, more preferably a metal oxide, and further preferably silica. Thus, it is possible to make the characteristics, such as mechanical strength and light resistance, of the three-dimensional structure particularly excellent. Further, due to excellent fluidity, silica is advantageous to the formation of a layer having higher thickness uniformity, and it is possible to make the productivity and dimensional accuracy of the three-dimensional structure 100 particularly excellent. Further, when the particle 11 is made of silica, in the surface of the manufactured three-dimensional structure, it is possible to more effectively prevent the scattering of light caused by the particles 11. Since silica generally has a hydroxyl group on the surface thereof, it can be suitably used.

As silica, commercially available silica can be preferably used.

The average particle diameter of the particles 11 is not particularly limited, but is preferably 1 µm to 25 µm, and more preferably 1 µm to 15 µm. Thus, it is possible to make the mechanical strength of the three-dimensional structure 100 particularly excellent, it is possible to more effectively prevent the occurrence of involuntary unevenness in the manufactured three-dimensional structure 100, and it is possible to make the dimensional accuracy of the three-dimensional structure 100 particularly excellent. Further, it is possible to make the fluidity of three-dimensional formation powder or the fluidity of a three-dimension formation composition containing the three-dimensional formation powder particularly excellent, and it is possible to make the productivity of the three-dimensional structure particularly excellent. In the invention, the average particle diameter refers to a volume average particle diameter, and can be obtained by measuring a dispersion liquid, which is prepared by adding a sample to methanol and dispersing the sample in methanol for 3 minutes using an ultrasonic disperser, using an aperture of 50 µm in a particle size distribution measuring instrument (TA-II, manufactured by Coulter Electronics INS.) using a coulter counter method.

The Dmax of the particle 11 is preferably 3 µm to 40 µm, and more preferably 5 µm to 30 µm. Thus, it is possible to make the mechanical strength of the three-dimensional structure 100 particularly excellent, it is possible to more effectively prevent the occurrence of involuntary unevenness in the manufactured three-dimensional structure 100, and it is possible to make the dimensional accuracy of the three-dimensional structure 100 particularly excellent. Further, it is possible to make the fluidity of three-dimensional formation powder or the fluidity of a three-dimension formation composition containing the three-dimensional formation powder particularly excellent, and it is possible to make the productivity of the three-dimensional structure 100 particularly excellent. Moreover, in the surface of the manufactured three-dimensional structure 100, it is possible to more effectively prevent the scattering of light caused by the particles 11.

The particle 11 may have any shape, but, preferably, has a spherical shape. Thus, it is possible to make the fluidity of three-dimensional formation powder or the fluidity of a three-dimension formation composition containing the three-dimensional formation powder particularly excellent, and it is possible to make the productivity of the three-dimensional structure 100 particularly excellent. Further, it is possible to more effectively prevent the occurrence of involuntary unevenness in the manufactured three-dimensional structure 100, and it is possible to make the dimensional accuracy of the three-dimensional structure 100 particularly excellent. Moreover, in the surface of the manufactured three-dimensional structure 100, it is possible to more effectively prevent the scattering of light caused by the particles 11.

The content ratio of the three-dimensional formation powder in the three-dimension formation composition is preferably 10 mass % to 90 mass %, and more preferably 15 mass % to 58 mass %. The particles 11 may be porous particles. Preferably, the bulk density of the porous particles is in a range of approximately 0.1 g/cm$^3$ to 1.0 g/cm$^3$. Porous powder having a bulk density in a range of 0.15 g/cm$^3$ to 0.5 g/cm$^3$ is more preferable. Thus, the fluidity of the three-dimension formation composition can be made sufficiently excellent, and the mechanical strength of the finally obtained three-dimensional structure 100 can be made particularly excellent.

Water-Soluble Resin

The three-dimension formation composition contains a plurality of particles 11 and a water-soluble resin 12. By allowing the three-dimension formation composition to contain the water-soluble resin 12, the particles 11 are bound (temporarily fixed) together to effectively prevent the involuntary scattering of the particles 11. Thus, it is possible to improve the safety of workers or the dimensional accuracy of the manufactured three-dimensional structure 100. Further, since the water-soluble resin 12 has high affinity to the surface of the particle 11, the surface of the particle 11 can be easily coated with the water-soluble resin.

The water-soluble resin 12 is preferably a resin in which at least a part thereof is soluble in water. For example, the solubility (dissolvable mass in 100 g of water) of the water-soluble resin 12 in water at 25° C. is more preferably 5 g/100 g water or more, and further more preferably 10 g/100 g water or more. Thus, the affinity of the water-soluble resin 12 to the surface of the particle 11 can be made higher, and, in the unbound particle removal process, unbound particles can be more easily removed.

In the three-dimension formation composition, it is preferable that the water-soluble resin 12 becomes a liquid state (for example, dissolved state, molten state, or the like) at least in the layer forming process. Thus, it is possible to easily and reliably make the thickness uniformity of the layer 1 formed using the three-dimension formation composition higher.

As the water-soluble resin 12, it is preferable to use a water-soluble resin containing at least one selected from the group consisting of polyvinyl alcohol, polyvinyl pyrrolidone, sodium polyacrylate, ammonium polyacrylate, carboxymethyl cellulose, hydroxyethyl cellulose, polyethylene oxide, polyethylene glycol, polyacryl amide, and polyethylene imine. Thus, it is possible to make the affinity of the water-soluble resin to the particle (hydrogen bond between the water-soluble functional group of the water-soluble resin 12 and the hydroxyl group, carboxyl group, or amino group of the surface of the particle 11) particularly high.

Further, since the water-soluble resin 12 has a hydroxyl group to have high affinity (solubility) to a water-based solvent, the water-soluble resin 12 can be uniformly dissolved. The content ratio of the water-soluble resin 12 in the three-dimension formation composition is preferably 15 vol % or less, and more preferably 2 vol % to 5 vol %, based on the bulk volume of the particle 11. Thus, the aforementioned function of the water-soluble resin 12 can be sufficiently exhibited, a space through which the curable ink 2 invades can be further widely secured, and the mechanical strength of the three-dimensional structure 100 can be made particularly excellent.

Water-Based Solvent

The three-dimension formation composition contains a water-based solvent in addition to the aforementioned water-soluble resin 12 and particles 11. Thus, when the fluidity of the three-dimension formation composition is made particularly excellent, it is possible to make the productivity of the three-dimensional structure 100 particularly excellent.

As the water-based solvent constituting the three-dimension formation composition, a water-based solvent containing water and/or liquid excellent in compatibility with water is used, but a water-based solvent mainly containing water is preferably used. In particular, a water-based solvent having a water content ratio of 70 wt % or more is preferable, and a water-based solvent having a water content ratio of 90 wt % or more is more preferable. Therefore, the water-soluble resin 12 can be more reliably dissolved, and thus the fluidity of the three-dimension formation composition or the composition uniformity of the layer 1 formed using the three-dimension formation composition can be made particularly excellent. Further, water is easily removed after the formation of the layer 1, and does not negatively influence the three-dimension formation composition even when it remains in the three-dimensional structure 100. Moreover, water is advantageous in terms of safety for the human body and environmental issues.

The content ratio of the water-based solvent in the three-dimension formation composition is preferably 5 mass % to 75 mass %, and more preferably 35 mass % to 70 mass %. Thus, the aforementioned effects due to containing the water-based solvent can be more remarkably exhibited, and, in the process of manufacturing the three-dimensional structure 100, the water-based solvent can be easily removed in a short time, and thus it is advantageous in terms of improvement in productivity of the three-dimensional structure 100.

In particular, when the three-dimension formation composition contains water as the water-based solvent, the content ratio of water in the three-dimension formation composition is preferably 20 mass % to 73 mass %, and more preferably 50 mass % to 70 mass %. Thus, the aforementioned effects are more remarkably exhibited.

Other Components

The three-dimension formation composition may contain components other than the aforementioned components. Examples of these components include a polymerization initiator, a polymerization accelerator, a penetration enhancer, a wetting agent (moisturizing agent), a fixing agent, a fungicide, an antiseptic agent, an antioxidant, an ultraviolet absorber, a chelating agent, and a pH adjuster.

3. Ultraviolet-Curable Ink

Next, an ultraviolet curable ink 2 used in a method of manufacturing the three-dimensional structure of the invention will be described in detail.

The ultraviolet curable ink 2 contains an ultraviolet-curable resin and a water-soluble monomer.

Ultraviolet-Curable Resin

The ultraviolet-curable resin is a component having a function of binding the particles 11 by curing with ultraviolet rays.

As the ultraviolet-curable resin, an ultraviolet-curable resin, by which addition polymerization or ring-opening polymerization is initiated by radical species or cationic species resulting from a photopolymerization initiator using ultraviolet irradiation to prepare a polymer, is preferably used. The types of addition polymerization include radical polymerization, cationic polymerization, anionic polymerization, metathesis, and coordination polymerization. The types of ring-opening polymerization include cationic polymerization, anionic polymerization, radical polymerization, metathesis, and coordination polymerization.

As the addition-polymerizable compound, there is exemplified a compound having at least one ethylenically-unsaturated double bond. As the addition-polymerizable compound, a compound having at least one terminal ethylenically-unsaturated bond, and preferably two or more terminal ethylenically-unsaturated bonds can be preferably used.

An ethylenically-unsaturated polymerizable compound has a chemical form of a monofunctional polymerizable compound, a polyfunctional polymerizable compound, or a mixture thereof. Examples of the monofunctional polymerizable compound include unsaturated carboxylic acids (for example, acrylic acid, methacrylic acid, itaconic acid, crotonic acid, isocrotonic acid, and maleic acid), esters thereof, and amides thereof. Examples of the polyfunctional polymerizable compound include esters of unsaturated carboxylic acids and aliphatic polyol compounds, and amides of unsaturated carboxylic acids and aliphatic polyvalent amine compounds.

Further, addition reaction products of unsaturated carboxylic esters or amides having a nucleophilic substituent, such as a hydroxyl group, an amino group, or a mercapto group, with isocyantes or epoxies; and dehydration condensation reaction products of such unsaturated carboxylic esters or amides with carboxylic acids can also be used. Moreover, addition reaction products of unsaturated carboxylic esters or amides having an electrophilic substituent, such as an isocyanate group or an epoxy group, with alcohols, amines, and thiols; and substitution reaction products of unsaturated carboxylic esters or amides having a leaving group, such as a halogen group or a tosyloxy group, with alcohols, amines and thiols can also be used.

Specific examples of radical polymerizable compounds, which are esters of unsaturated carboxylic acids and aliphatic polyol compounds, include (meth)acrylic esters. Among these (meth)acrylic esters, any one of monofunctional (meth)acrylic esters and polyfunctional (meth)acrylic esters can also be used.

Specific examples of monofunctional (meth)acrylates include phenoxyethyl (meth)acrylate, phenyloxyethyl (meth)acrylate, cyclohexyl (meth)acrylate, ethyl (meth)acrylate, methyl (meth)acrylate, isobornyl (meth)acrylate, tetrahydrofurfuryl (meth)acrylate, and 4-hydroxybutyl (meth)acrylate.

Specific examples of difunctional (meth)acrylates include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, dipentaerythritol di(meth)acrylate, 2-(2-vinyloxyethoxy) ethyl (meth)acrylate, dipropylene glycol diacrylate, and tripropylene glycol diacrylate.

Specific examples of trifunctional (meth)acrylates include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, and sorbitol tri(meth)acrylate.

Specific examples of tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of pentafunctional (meth)acrylates include sorbitol penta(meth)acrylate and dipentaerythritol penta(meth)acrylate.

Specific examples of hexafunctional (meth)acrylates include dipentaerythritol hexa(meth)acrylate, sorbitol hexa(meth)acrylate, alkylene oxide-modified hexa(meth)acrylate of phosphazene, and caprolactone-modified dipentaerythritol hexa(meth)acrylate.

Examples of polymerizable compounds other than (meth)acrylates include itaconic acid esters, crotonic acid esters, isocrotonic acid esters, and maleic acid esters.

Examples of itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid esters include ethylene glycol dicrotonate, tetramethylene glycol dicrotonate, pentaerythritol dicrotonate, and sorbitol tetradicrotonate.

Examples of isocrotonic acid esters include ethylene glycol diisocrotonate, pentaerythritol diisocrotonate, and sorbitol tetraisocrotonate.

Examples of maleic acid esters include ethylene glycol dimaleate, triethylene glycol dimaleate, pentaerythritol dimaleate, and sorbitol tetramaleate.

As other esters, for example, aliphatic alcohol esters disclosed in JP-B-46-27926, JP-B-51-47334, and JP-A-57-196231, esters having an aromatic skeleton disclosed in JP-A-59-5240, JP-A-59-5241, and JP-A-2-226149, and esters having an amino group disclosed in JP-A-1-165613 can be used.

Specific examples of monomers of amides of unsaturated carboxylic acids and aliphatic polyvalent amine compounds include methylene bis-acrylamide, methylene bis-methacrylamide, 1,6-hexamethylene bis-acrylamide, 1,6-hexamethylene bis-methacrylamide, diethylenetriamine tris-acrylamide, xylylene bisacrylamide, and xylylene bismethacrylamide.

Examples of preferable other amide-based monomers include amide-based monomers having a cyclohexylene structure, disclosed in JP-B-54-21726.

Further, a urethane-based addition-polymerizable compound prepared using the addition reaction of isocyanate and a hydroxyl group is preferable. A specific examples thereof includes a vinyl urethane compound having two or more polymerizable vinyl groups in one molecule, which is prepared by adding a hydroxyl group-containing vinyl monomer represented by the following formula (1) to a polyisocyanate compound having two or more isocyanate groups in one molecule, disclosed in JP-B-48-41708.

$$CH_2=C(R^1)COOCH_2CH(R^2)OH \quad (1)$$

(In Formula (1), $R^1$ and $R^2$ each independently represents H or $CH^3$.)

In the invention, a cationic ring-opening polymerizable compound having at least one cyclic ether group such as an epoxy group or an oxetane group in a molecule can be suitably used as an ultraviolet-curable resin (polymerizable compound).

Examples of the cationic polymerizable compound include curable compounds containing a ring-opening polymerizable group. Among these, a curable compound containing a heterocyclic group is particularly preferable. Examples of such curable compounds include epoxy derivatives, oxetane derivatives, tetrahydrofuran derivatives, cyclic lactone derivatives, cyclic carbonate derivatives, cyclic imino ethers such as oxazoline derivatives, and vinyl ethers. Among them, epoxy derivatives, oxetane derivatives, and vinyl ethers are preferable.

Examples of preferable epoxy derivatives include monofunctional glycidyl ethers, polyfunctional glycidyl ethers, monofunctional alicyclic epoxies, and polyfunctional alicyclic epoxies.

Examples of specific compounds of glycidyl ethers include: diglycidyl ethers (for example, ethylene glycol diglycidyl ether and bisphenol A diglycidyl ether); tri- or higher functional glycidyl ethers (for example, trimethylolethane triglycidyl ether, trimethylolpropane triglycidyl ether, glycerol triglycidyl ether, and triglycidyl tris-hydroxyethyl isocyanurate); tetra- or higher functional glycidyl ethers (for example, sorbitol tetraglycidyl ether, pentaerythritol tetraglycidyl ether, polyglycidyl ethers of cresol novolac resins, and polyglycidyl ethers of phenolic novolac resin); alicyclic epoxy compounds (for example, CELLOXIDE 2021P, CELLOXIDE 2081, EPOLEAD GT-301, and EPOLEAD GT-401 (all are manufactured by Daicel Chemical Industries Co., Ltd.) EHPE (manufactured by Daicel Chemical Industries Co., Ltd.), and polycyclohexyl epoxymethyl ethers of phenolic novolac resins); and oxetanes (for example, OX-SQ, and PNOX-1009 (all are manufactured by Toagosei Co., Ltd.)).

As the polymerizable compound, an alicyclic epoxy derivative can be preferably used. The "alicyclic epoxy group" refers to a partial structure in which a double bond of a ring of a cycloalkene group such as a cyclopentene group or a cyclohexene group is epoxidized with a suitable oxidant such as hydrogen peroxide or peracid.

As the alicyclic epoxy compound, polyfunctional alicyclic epoxy compounds having two or more cyclohexene oxide groups or cyclopentene oxide groups in one molecule are preferable. Specific examples of the alicyclic epoxy compound include 4-vinylcyclohexene dioxide, (3,4-epoxycyclohexyl)methyl-3,4-epoxycyclohexyl carboxylate, di(3,4-epoxycyclohexyl) adipate, di(3,4-epoxycyclohexylmethyl) adipate, bis(2,3-epoxy cyclopentyl) ether, di(2,3-epoxy-6-methylcyclohexyl methyl) adipate, and dicyclopentadiene dioxide.

A general glycidyl compound having an epoxy group, which does not have an alicyclic structure in a molecule, can be used alone or in combination with the above alicyclic epoxy compound.

Examples of the general glycidyl compound include glycidyl ether compounds and glycidyl ester compounds. It is preferable that the general glycidyl compound is used in combination with glycidyl ether compounds.

Specific examples of glycidyl ether compounds include: aromatic glycidyl ether compounds, such as 1,3-bis(2,3-epoxypropyloxy)benzene, bisphenol A type epoxy resins, bisphenol F type epoxy resins, phenol.novolac type epoxy resins, cresol.novolac type epoxy resins, and trisphenolmethane type epoxy resin; and aliphatic glycidyl ether compounds, such as 1,4-butanediol glycidyl ether, glycerol triglycidyl ether, propylene glycol diglycidyl ether, and trimethylolpropane triglycidyl ether. Examples of glycidyl esters may include glycidyl esters of a linolenic acid dimer.

As the polymerizable compound, a compound having an oxetanyl group which is a cyclic ether of a four-membered ring (hereinafter, simply referred to as "oxetane compound") can be used. The oxetanyl group-containing compound is a compound having one or more oxetanyl groups in one molecule.

Here, the curable ink 2 may contain a curable resin other than the ultraviolet-curable resin.

The content ratio of the ultraviolet-curable resin in the ultraviolet-curable ink 2 is preferably 80 mass % or more, and more preferably 85 mass % or more. In this case, it is possible to make the mechanical strength of the finally obtained three-dimensional structure 100 particularly excellent.

Water-Soluble Monomer

A water-soluble monomer is contained in the ultraviolet-curable ink 2.

When the water-soluble monomer is contained in the ultraviolet-curable ink 2, it is possible to permeate the ultraviolet-curable ink 2. As a result, it is possible to uniformly permeate the ultraviolet-curable ink 2.

The water-soluble monomer is not particularly limited, but, as the water-soluble monomer, it is preferable to use at least one selected from the group consisting of 4-hydroxybutyl acrylate, 2-hydroxybutyl acrylate, and phenol-based epoxy acrylate. In this case, due to the hydroxyl group of the water-soluble monomer, the affinity of the ultraviolet-curable ink 2 to the layer 1 can be improved, and the permeability thereof can be made higher. Further, the mechanical strength of the finally obtained three-dimensional structure 100 can be made particularly excellent by the hydrogen bond between the water-soluble resin and the particle, the hydrogen bond between the water-soluble resin and the water-soluble monomer, and the hydrogen bond between the particle and the water-soluble monomer.

The content ratio of the water-soluble monomer in the ultraviolet-curable ink 2 is preferably 30 mass % to 90 mass %, and more preferably 35 mass % to 50 mass %. In this case, it is possible to make the mechanical strength of the finally obtained three-dimensional structure 100 particularly excellent.

Other Components

The ultraviolet-curable ink 2 may contain components other than the aforementioned components. Examples of these components include various colorants such as pigments and dyes; dispersants; surfactants; polymerization initiators; polymerization accelerators; solvents; penetration enhancers; wetting agents (moisturizing agents); fixing agents; fungicides; antiseptic agents; antioxidants; ultraviolet absorbers; chelating agents; pH adjusters; thickeners; fillers; aggregation inhibitors; and defoamers.

Particularly, when the ultraviolet-curable ink 2 contains the colorant, it is possible to obtain a three-dimensional structure 100 colored in a color corresponding to the color of the colorant.

Particularly, when the ultraviolet-curable ink 2 contains pigment as the colorant, it is possible to make the light resistance of the ultraviolet-curable ink 2 or the three-dimensional structure 100 good. As the pigment, both inorganic pigments and organic pigments can be used.

Examples of inorganic pigments include carbon blacks (C.I. Pigment Black 7) such as furnace black, lamp black, acetylene black, and channel black; iron oxides; titanium oxides; and the like. They can be used alone or in a combination of two or more selected therefrom.

Among these inorganic pigments, in order to exhibit preferable white color, titanium oxide is preferable.

Examples of organic pigments include azo pigments such as insoluble azo pigments, condensed azo pigments, azo lakes, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigments; dye chelates (for example, basic dye chelates, acidic dye chelates, and the like); staining lakes (basic dye lakes, acidic dye lakes); nitro pigments; nitroso pigments; aniline blacks; and daylight fluorescent pigments. They can be used alone or in a combination of two or more selected therefrom.

When the ultraviolet-curable ink 2 contains a pigment, the average particle diameter of the pigment is preferably 300 nm or less, and more preferably 50 nm to 250 nm. Thus, the discharge stability of the ultraviolet-curable ink 2 and the dispersion stability of the pigment in the ultraviolet-curable ink 2 can be made particularly excellent, and images with better image quality can be formed.

Examples of dyes include acid dyes, direct dyes, reactive dyes, and basic dyes. They can be used alone or in a combination of two or more selected therefrom.

When the ultraviolet-curable ink 2 contains a colorant, the content ratio of the colorant in the ultraviolet-curable ink 2 is preferably 1 mass % to 20 mass %. Thus, particularly excellent hiding properties and color reproducibility are obtained.

Particularly, when the ultraviolet-curable ink 2 contains titanium oxide as the colorant, the content ratio of titanium oxide in the ultraviolet-curable ink 2 is preferably 12 mass % to 18 mass %, and more preferably 14 mass % to 16 mass %. Thus, particularly excellent hiding properties are obtained.

When the ultraviolet-curable ink 2 contains a dispersant in addition to a pigment, the dispersibility of the pigment can be further improved. As a result, it is possible to more effectively suppress the partial reduction in mechanical strength due to the bias of the pigment.

The dispersant is not particularly limited, but examples thereof include dispersants, such as a polymer dispersant, generally used in preparing a pigment dispersion liquid. Specific examples of the polymer dispersants include polymer dispersants containing one or more of polyoxyalkylene polyalkylene polyamine, vinyl-based polymers and copolymers, acrylic-based polymers and copolymers, polyesters, polyamides, polyimides, polyurethanes, amino-based polymers, silicon-containing polymers, sulfur-containing polymers, fluorinated polymers, and epoxy resins, as main components thereof. Examples of commercially available products of the polymer dispersants include AJISPER series of Ajinomoto Fine-techno Co., Inc.; Solsperse series (Solsperse 36000 and the like) commercially available from Noveon Inc.; DISPERBYK series of BYK Japan K.K.; and DISPARLON series of Kusumoto Chemicals, Ltd.

When the ultraviolet-curable ink 2 contains a surfactant, the abrasion resistance of the three-dimensional structure 100 can be more improved. The surfactant is not particularly limited, but examples thereof include silicone-based surfactants such as polyester-modified silicone, and polyether-modified silicone. Among these, polyether-modified polydimethylsiloxane or polyester-modified polydimethylsiloxane is preferably used. Specific examples of the surfactant include BYK-347, BYK-348, BYK-UV3500, 3510, 3530, and 3570 (all are trade names of BYK Japan K.K.).

The ultraviolet-curable ink 2 may contain a solvent. Thus, the viscosity of the ultraviolet-curable ink 2 can be suitably adjusted, and the discharge stability of the ultraviolet-curable ink 2 by an ink jet method can be particularly excellent even when it contains a component having high viscosity.

Examples of the solvent include (poly)alkylene glycol monoalkyl ethers, such as ethylene glycol monomethyl ether, ethylene glycol monoethyl ether, propylene glycol monomethyl ether, and propylene glycol monoethyl ether; acetic acid esters, such as ethyl acetate, n-propyl acetate, iso-propyl acetate, n-butyl acetate, and iso-butyl acetate; aromatic hydrocarbons, such as benzene, toluene, and xylene; ketones, such as methyl ethyl ketone, acetone, methyl isobutyl ketone, ethyl-n-butyl ketone, diisopropyl ketone, and acetylacetone; and alcohols, such as ethanol, propanol, and butanol. They can be used alone or in a combination of two or more selected therefrom.

The viscosity of the ultraviolet-curable ink 2 is preferably 10 mPa·s to 25 mPa·s, and more preferably 15 mPa·s to 20 mPa·s. Thus, the discharge stability of the ink by an ink jet method can be made particularly excellent. In the present specification, viscosity refers to a value measured at 25° C. using an E-type viscometer (VISCONIC ELD, manufactured by Tokyo Keiki Inc.).

Meanwhile, in the manufacture of the three-dimensional structure 100, several kinds of ultraviolet-curable inks 2 may be used.

For example, ultraviolet-curable ink 2 (color ink) containing a colorant and ultraviolet-curable ink 2 (clear ink) containing no colorant may be used. Thus, for example, for the appearance of the three-dimensional structure 100, the ultraviolet-curable ink 2 containing a colorant may be used as a curable ink 2 applied to the region influencing color tone, and, for the appearance of the three-dimensional structure 100, the ultraviolet-curable ink 2 containing no colorant may be used as a curable ink 2 applied to the region not influencing color tone. Further, in the finally obtained three-dimensional structure 100, several kinds of ultraviolet-curable inks 2 may be used in combination with each other such that the region (coating layer) formed using the ultraviolet-curable ink 2 containing no colorant is provided on the outer surface of the region formed using the ultraviolet-curable ink 2 containing a colorant.

For example, several kinds of ultraviolet-curable inks 2 containing colorants having different compositions from each other may be used. Thus, a wide color reproducing area that can be expressed can be realized by the combination of these ultraviolet-curable inks 2.

When several kinds of ultraviolet-curable inks 2 are used, it is preferable that at least indigo-violet (cyan) curable ink 2, red-violet (magenta) curable ink 2, and yellow curable ink 2 are used. Thus, a wider color reproducing area that can be expressed can be realized by the combination of these curable inks 2.

Further, for example, the following effects are obtained by the combination of white ultraviolet-curable ink 2 and the other colored ultraviolet-curable ink 2. That is, the finally obtained three-dimensional structure 100 can have a first area on which a white ultraviolet-curable ink 2 is applied, and a second area which overlaps with the first area and is provided outside the first area and on which a ultraviolet-curable ink 2 having a color other than white color is applied. Thus, the first area on which a white ultraviolet-curable ink 2 is applied can exhibit hiding properties, and the color saturation of the three-dimensional structure 100 can be enhanced.

4. Three-Dimension Formation Material Set

The three-dimension formation material set includes: the aforementioned three-dimension formation composition containing particles having hydrophilicity on a surface thereof, a water-soluble resin, and a water-based solvent; and the aforementioned ultraviolet-curable ink containing a water-soluble monomer.

When the three-dimension formation material set is used, it is possible to efficiently manufacture a three-dimensional structure having excellent mechanical strength.

5. Three-Dimensional Structure

The three-dimensional structure of the invention can be manufactured using the aforementioned method of manufacturing a three-dimensional structure. Thus, it is possible to provide a three-dimensional structure having excellent mechanical strength.

Applications of the three-dimensional structure of the invention are not particularly limited, but examples thereof include appreciated and exhibited objects such as dolls and figures; and medical instruments such as implants; and the like.

In addition, the three-dimensional structure of the invention may be applied to prototypes, mass-produced products, made-to-order goods, and the like.

Although preferred embodiments of the invention have been described, the invention is not limited thereto.

More specifically, for example, it has been described in the aforementioned embodiment that, in addition to the layer forming process, and the ink discharge process, the curing process is also repeated in conjunction with the layer forming process, and the ink discharge process. However, the curing process may not be repeated. For example, the curing process may be carried out collectively after forming a laminate having a plurality of layers that are not cured.

In the method of manufacturing a three-dimensional structure according to the invention, if necessary, a pre-treatment process, an intermediate treatment process, or a post-treatment process may be carried out. As an example of the pre-treatment process, a process of cleaning a support (stage) is exemplified.

As the intermediate treatment process, for example, when the three-dimension formation composition contains a solvent component (dispersion medium) such as water, a process of removing the solvent component may be carried out between the layer forming process and the ink discharge process. Thus, the layer forming process can be more smoothly performed, and the unintentional variation in the thickness of the formed layer can be more effectively prevented. As a result, it is possible to manufacture a three-dimensional structure having higher dimensional accuracy with higher productivity.

Examples of the post-treatment process include a cleaning process, a shape adjusting process of performing deburring or the like, a coloring process, a process of forming a covering layer, and an ultraviolet-curable resin curing completion process of performing light irradiation treatment or heat treatment for reliably curing an uncured ultraviolet-curable resin.

Further, it has been described in the aforementioned embodiment that the ink is applied to all of the layers. However, a layer on which the ink is not applied may exist. For example, the ink may not be applied to the layer formed immediately on a support (stage), thus allowing this layer to function as a sacrificial layer.

Moreover, in the aforementioned embodiment, the case of performing the ink discharge process using an ink jet method has been mainly described. However, the ink discharge process may be performed using other methods (for example, other printing methods).

EXAMPLES

Hereinafter, the invention will be described in more detail with reference to the following specific Examples, but the invention is not limited to these Examples. In the following description, particularly, it is assumed that treatment showing no temperature condition is performed at room temperature (25° C.). Further, in the case where a temperature condition is not shown even under various measurement conditions, it is assumed that the measured values are values measured at room temperature (25° C.)

1 Manufacture of Three-Dimensional Structure

Example 1

1. Preparation of Three-Dimension Formation Composition

First, powder, which is composed of silica particles each having a plurality of hydroxyl groups on the surface thereof (porous silica particles each having a hydroxyl group on the surface thereof, formed by a precipitation method, average particle diameter: 2.6 µm, bulk density: 0.2 g/cm$^3$), was prepared.

Next, 16 parts by mass of the powder, 59 parts by mass of water, and 25 parts by mass of polyethylene oxide (viscosity average molecular weight: 150,000 to 400,000) were mixed to obtain a three-dimension formation composition.

2. Manufacture of Three-Dimensional Structure

Figure 4:
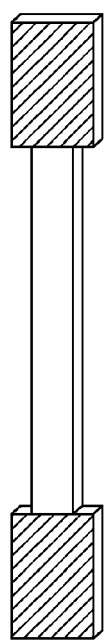
FIG. 4 is a perspective view showing the shape of a three-dimensional structure (three-dimensional structure A) manufactured in each of Examples and Comparative Examples.
Figure 5:
FIG. 5 is a perspective view showing the shape of a three-dimensional structure (three-dimensional structure B) manufactured in each of Examples and Comparative Examples.

The three-dimensional structure A having a shape shown in FIG. 4, that is, having a shape with a 4 mm (thickness)× 150 mm (length), each of the regions provided at both ends indicated by a hatched area (upper and lower ends in FIG. 4) has a width of 20 mm and a length of 35 mm, and the region that is sandwiched between these regions has a width of 10 mm and a length of 80 mm was manufactured using the obtained three-dimension formation composition as follows. Further, the three-dimensional structure B having a shape shown in FIG. 5, that is, having a cubic shape of 4 mm (thickness)×10 mm (width)×80 mm (length) was also manufactured using the obtained three-dimension formation composition as follows.

First, a three-dimension forming apparatus was prepared, and a layer (thickness: 100 µm) was formed on the surface of a support (stage) using the three-dimension formation composition by a squeegee method (layer forming process).

Next, the formed layer was left at room temperature for 1 minute, thereby removing water contained in the three-dimension formation composition.

Next, curable ink was applied to the layer made of the three-dimension formation composition in a predetermined pattern by an ink jet method (ink discharge process). As the curable ink, a curable ink having the following composition and a viscosity of 22 mPa·s at 25° C. was used.

Ultraviolet-Curable Resin
  phenoxyethyl acrylate: 40.8 mass %
  diethylene glycol diacrylate: 5 mass %
Water-Soluble Monomer
  4-hydroxybutyl acrylate: 50 mass %
Polymerization Initiator
  bis(2,4,6-trimethylbenzoyl)-phenylphosphine oxide: 1 mass %
  2,4,6-trimethylbenzoyl-diphenylphosphine oxide: 2 mass % Fluorescent whitening agent (sensitizer)
  1,4-bis-(benzoxazole-2-yl) naphthalene: 0.2 mass %
Surfactant
  polyether-modified polydimethylsiloxane: 1 mass %

Next, the layer was irradiated with ultraviolet rays to cure the ultraviolet-curable resin contained in the three-dimension formation composition (curing process).

Thereafter, a series of processes of the layer forming process to the curing process were repeated such that a plurality of layers were laminated while changing the pattern of the applied ink depending on the shape of the three-dimensional structure to be manufactured.

Next, the entire obtained laminate was heated at 60° C. for 100 minutes (heating process).

Thereafter, the laminate obtained in this way was dipped into water, and ultrasonic vibration was applied thereto to remove the particles not bound by the ultraviolet curable resin (unbound particles) from the particles constituting each of the layers, thereby obtaining the three-dimensional structure A and the three-dimensional structure B two by two, respectively.

Thereafter, a drying process was carried out at 60° C. for 20 minutes.

Examples 2 to 14, Comparative Examples 1 to 3

Three-dimensional structures were respectively manufactured in the same manner as in Example 1, except that the configuration of each of the three-dimension formation compositions was changed as shown in Table 1 by changing the kinds of raw materials used in preparing the three-dimension formation composition and the combination ratio of each of the components, and that each of the ultraviolet-curable inks shown in Table 2 was used as this ultraviolet-curable ink.

The configurations of the three-dimension formation compositions of Examples and Comparative Examples are summarized in Table 1, and the configurations of the ultraviolet-curable inks thereof are summarized in Table 2. In Tables 1 and 2, silica is expressed as "SiO$_2$", alumina is expressed as "Al$_2$O$_3$", titanium oxide is expressed as "TiO$_2$", calcium carbonate is expressed as "CaCO$_3$", polyethylene is expressed as "PE", polypropylene is expressed as "PP", a hydroxyl group is expressed as "OH", a carboxyl group is expressed as "COOH", an amino group is expressed as "NH$_2$", polyethylene oxide is expressed as "PEO", sodium polyacrylate is expressed as "PANa", ammonium polyacrylate is expressed as "PANH$_3$", hydroxyethyl cellulose is expressed as "HEC", polyvinyl pyrrolidone is expressed as "PVP", polyethylene glycol is expressed as "PEG", polyvinyl alcohol is expressed as "PVA", carboxymethyl cellulose is expressed as "CMC", polyacrylamide is expressed as "PAA", polyethylene imine is expressed as "PEI", 4-hydroxybutyl acrylate is expressed as "4HB", 2-hydroxybutyl acrylate is expressed as "2HB", and phenol-based epoxy acrylate is expressed as "EPA".

Here, a carboxyl group was introduced into the particle surface by surface-treating the surface of a silica particle with 3-trimethoxysilylpropyl succinic anhydride.

Further, an amino group was introduced into the particle surface by surface-treating the surface of a silica particle with 3-aminopropyltriethoxysilane.

In Examples 2 to 7, porous silica particles, which are the same as the particles of Example 1 having pores, were used as the particles of the three-dimension formation composition, and, in Examples 8 to 14 and Comparative Examples 1 to 3, particles having no pores, called dense solid particles, were used as the particles of the three-dimension formation composition.

TABLE 1

Three-dimension formation composition

| | Particle | | | Water-soluble resin | | Water |
|---|---|---|---|---|---|---|
| | Kind | Kind of functional groups of surface | Content ratio (mass %) | Kind | Content ratio (mass %) | Content ratio (mass %) |
| Ex. 1 | $SiO_2$ | OH | 16.0 | PEO | 25.0 | 59.0 |
| Ex. 2 | $SiO_2$ | OH | 16.0 | PANa | 25.0 | 59.0 |
| Ex. 3 | $SiO_2$ | OH | 16.0 | $PANH_3$ | 25.0 | 59.0 |
| Ex. 4 | $SiO_2$ | OH | 16.0 | HEC | 25.0 | 59.0 |
| Ex. 5 | $SiO_2$ | OH | 16.0 | PVP | 25.0 | 59.0 |
| Ex. 6 | $SiO_2$ | OH | 16.0 | PAA | 25.0 | 59.0 |
| Ex. 7 | $SiO_2$ | OH | 16.0 | PEI | 25.0 | 59.0 |
| Ex. 8 | $Al_2O_3$ | OH | 16.0 | PEG | 25.0 | 59.0 |
| Ex. 9 | $TiO_2$ | OH | 16.0 | PVA | 25.0 | 59.0 |
| Ex. 10 | $CaCo_3$ | OH | 16.0 | CMC | 25.0 | 59.0 |
| Ex. 11 | $SiO_2$ | COOH | 16.0 | PEO | 25.0 | 59.0 |
| Ex. 12 | $SiO_2$ | $NH_2$ | 16.0 | PEO | 25.0 | 59.0 |
| Ex. 13 | $SiO_2$ | OH | 16.0 | PEO | 25.0 | 59.0 |
| Ex. 14 | $SiO_2$ | OH | 16.0 | PEO | 25.0 | 59.0 |
| Comp. Ex. 1 | PE | — | 16.0 | PEO | 25.0 | 59.0 |
| Comp. Ex. 2 | PP | — | 16.0 | PEO | 25.0 | 59.0 |
| Comp. Ex. 3 | $SiO_2$ | OH | 16.0 | PEO | 25.0 | 59.0 |

TABLE 2

Ultraviolet-curable ink

| | Ultraviolet-curable resin Content ratio (mass %) | Water-soluble monomer | | Polymerization initiator Content ratio (mass %) | Sensitizer Content ratio (mass %) | Surfactant Content ratio (mass %) |
|---|---|---|---|---|---|---|
| | | Kind | Content ratio (mass %) | | | |
| Ex. 1 | 45.8 | 4HB | 50.0 | 3.0 | 0.2 | 1.0 |
| Ex. 2 | 45.8 | 4HB | 50.0 | 3.0 | 0.2 | 1.0 |
| Ex. 3 | 45.8 | 4HB | 50.0 | 3.0 | 0.2 | 1.0 |
| Ex. 4 | 45.8 | 4HB | 50.0 | 3.0 | 0.2 | 1.0 |
| Ex. 5 | 45.8 | 4HB | 50.0 | 3.0 | 0.2 | 1.0 |
| Ex. 6 | 45.8 | 4HB | 50.0 | 3.0 | 0.2 | 1.0 |
| Ex. 7 | 45.8 | 4HB | 50.0 | 3.0 | 0.2 | 1.0 |
| Ex. 8 | 45.8 | 4HB | 50.0 | 3.0 | 0.2 | 1.0 |
| Ex. 9 | 45.8 | 4HB | 50.0 | 3.0 | 0.2 | 1.0 |
| Ex. 10 | 45.8 | 4HB | 50.0 | 3.0 | 0.2 | 1.0 |
| Ex. 11 | 45.8 | 4HB | 50.0 | 3.0 | 0.2 | 1.0 |
| Ex. 12 | 45.8 | 4HB | 50.0 | 3.0 | 0.2 | 1.0 |
| Ex. 13 | 45.8 | 2HB | 50.0 | 3.0 | 0.2 | 1.0 |
| Ex. 14 | 45.8 | EPA | 50.0 | 3.0 | 0.2 | 1.0 |
| Comp. Ex. 1 | 45.8 | 4HB | 50.0 | 3.0 | 0.2 | 1.0 |
| Comp. Ex. 2 | 45.8 | 4HB | 50.0 | 3.0 | 0.2 | 1.0 |
| Comp. Ex. 3 | 45.8 | — | 50.0 | 3.0 | 0.2 | 1.0 |

3 Evaluation 3.1 Tensile Strength and Tensile Elastic Modulus

The tensile strength and tensile elastic modulus of the three-dimensional structure A of each of Examples and Comparative Examples were measured under the conditions of a tensile yield stress of 50 mm/min and a tensile elastic modulus of 1 mm/min based on JIS K 7161: 1994 (ISO 527: 1993). The tensile strength and tensile elastic modulus thereof were evaluated according to the following criteria.

Tensile Strength
A: tensile strength of 35 MPa or more
B: tensile strength of 30 MPa to less than 35 MPa
C: tensile strength of 20 MPa to less than 30 MPa
D: tensile strength of 10 MPa to less than 20 MPa
E: tensile strength of less than 10 MPa Tensile Elastic Modulus
A: tensile elastic modulus of 1.5 GPa or more
B: tensile elastic modulus of 1.3 GPa to less than 1.5 GPa
C: tensile elastic modulus of 1.1 GPa to less than 1.3 GPa
D: tensile elastic modulus of 0.9 GPa to less than 1.1 GPa
E: tensile elastic modulus of less than 0.9 GPa 3.2 Bending Strength and Bending Elastic Modulus The bending strength and bending elastic modulus of the three-dimensional structure B of each of Examples and Comparative Examples were measured under the conditions of a distance between supporting points of 64 mm and a testing speed of 2 mm/min based on JIS K 7171: 1994 (ISO 178: 1993). The bending strength and bending elastic modulus thereof were evaluated according to the following criteria.

Bending Strength
A: bending strength of 65 MPa or more
B: bending strength of 60 MPa to less than 65 MPa
C: bending strength of 45 MPa to less than 60 MPa
D: bending strength of 30 MPa to less than 45 MPa
E: bending strength of less than 30 MPa Bending Elastic Modulus
A: bending elastic modulus of 2.4 GPa or more
B: bending elastic modulus of 2.3 GPa to less than 2.4 GPa
C: bending elastic modulus of 2.2 GPa to less than 2.3 GPa
D: bending elastic modulus of 2.1 GPa to less than 2.2 GPa
E: bending elastic modulus of less than 2.1 GPa These results are summarized in Table 3.

TABLE 3

|  | Tensile strength | Tensile elastic modulus | Bending strength | Bending elastic modulus |
|---|---|---|---|---|
| Ex. 1 | A | A | A | A |
| Ex. 2 | A | A | A | A |
| Ex. 3 | A | A | A | A |
| Ex. 4 | A | A | A | A |
| Ex. 5 | A | A | A | A |
| Ex. 6 | A | A | A | A |
| Ex. 7 | A | A | A | A |
| Ex. 8 | A | A | A | A |
| Ex. 9 | A | A | A | A |
| Ex. 10 | A | A | A | A |
| Ex. 11 | A | A | A | A |
| Ex. 12 | A | A | A | A |
| Ex. 13 | A | A | A | A |
| Ex. 14 | A | A | A | A |
| Comp. Ex. 1 | E | E | E | E |
| Comp. Ex. 2 | E | E | E | E |
| Comp. Ex. 3 | D | D | D | D |

As apparent from Table 3, in the invention, three-dimensional structures having excellent mechanical strength were obtained. In contrast to this, in Comparative Examples, sufficient results were not obtained.

The entire disclosure of Japanese Patent Application No. 2014-183382, filed Sep. 9, 2014 is expressly incorporated by reference herein.

What is claimed is:

1. A method of manufacturing a three-dimensional structure, in which the three-dimensional structure is manufactured by laminating a layer, the method comprising:
   forming the layer using a three-dimension formation composition containing particles having hydrophilicity on a surface thereof, a water-soluble resin, and a water-based solvent; and
   discharging an ultraviolet-curable ink containing a water-soluble monomer onto the layer.

2. The method of manufacturing a three-dimensional structure according to claim 1, further comprising:
   removing the particles, which are not bound by the ultraviolet-curable ink, after repeating the forming of the layer and the discharging of the ultraviolet-curable ink.

3. The method of manufacturing a three-dimensional structure according to claim 1,
   wherein the particle has at least one functional group selected from the group consisting of a hydroxyl group, a carboxyl group, and an amino group, on the surface thereof.

4. The method of manufacturing a three-dimensional structure according to claim 1,
   wherein the water-soluble monomer is at least one selected from the group consisting of 4-hydroxybutyl acrylate, 2-hydroxybutyl acrylate, and phenol-based epoxy acrylate.

5. The method of manufacturing a three-dimensional structure according to claim 1,
   wherein the water-soluble resin contains at least one selected from the group consisting of polyvinyl alcohol, polyvinyl pyrrolidone, sodium polyacrylate, ammonium polyacrylate, carboxymethyl cellulose, hydroxyethyl cellulose, polyethylene oxide, polyethylene glycol, polyacryl amide, and polyethylene imine.

6. A three-dimension formation material set, which is used to manufacture a three-dimensional structure by laminating a layer, the set comprising:
   a three-dimension formation composition containing particles having hydrophilicity on a surface thereof, a water-soluble resin, and a water-based solvent; and
   an ultraviolet-curable ink containing a water-soluble monomer.

7. A three-dimensional structure, which is manufactured by the method of manufacturing a three-dimensional structure according to claim 1.

8. A three-dimensional structure, which is manufactured by the method of manufacturing a three-dimensional structure according to claim 2.

9. A three-dimensional structure, which is manufactured by the method of manufacturing a three-dimensional structure according to claim 3.

10. A three-dimensional structure, which is manufactured by the method of manufacturing a three-dimensional structure according to claim 4.

11. A three-dimensional structure, which is manufactured by the method of manufacturing a three-dimensional structure according to claim 5.

* * * * *